(12) United States Patent
Pegg (10) Patent No.: US 9,178,957 B2
(45) Date of Patent: Nov. 3, 2015

(54) APPLICATION AND DATA AGNOSTIC COLLABORATION SERVICES

(75) Inventor: Nigel Pegg, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1008 days.

(21) Appl. No.: 11/863,100

(22) Filed: Sep. 27, 2007

(65) Prior Publication Data

US 2009/0089379 A1   Apr. 2, 2009

(51) Int. Cl.

| | |
|---|---|
| *G06F 9/54* | (2006.01) |
| *H04L 29/06* | (2006.01) |
| *H04L 29/08* | (2006.01) |
| *H04L 12/18* | (2006.01) |
| *H04L 12/58* | (2006.01) |
| *G06Q 10/10* | (2012.01) |

(52) U.S. Cl.
CPC ............. *H04L 67/2823* (2013.01); *G06F 9/54* (2013.01); *G06Q 10/10* (2013.01); *H04L 12/1813* (2013.01); *H04L 12/1827* (2013.01); *H04L 51/04* (2013.01); *H04L 51/36* (2013.01)

(58) Field of Classification Search
CPC ..... H04L 51/04; H04L 12/1813; H04L 51/36; H04L 67/2823
USPC ........................................................ 709/206
See application file for complete search history.

(56) References Cited

U.S. PATENT DOCUMENTS

| | | | |
|---|---|---|---|
| 5,627,936 A | 5/1997 | Prasad et al. | |
| 5,892,915 A | 4/1999 | Duso et al. | |
| 6,321,252 B1 | 11/2001 | Bhola | |
| 6,342,906 B1 | 1/2002 | Kumar et al. | |
| 6,343,313 B1 | 1/2002 | Salesky et al. | |
| 6,357,042 B2 | 3/2002 | Srinivasan et al. | |
| 6,721,921 B1 | 4/2004 | Altman | |
| 6,898,642 B2 | 5/2005 | Chafle et al. | |
| 6,915,512 B1 | 7/2005 | Miyajima | |
| 7,085,558 B2 | 8/2006 | Berstis et al. | |

(Continued)

FOREIGN PATENT DOCUMENTS

| | | |
|---|---|---|
| EP | 1614288 | 11/2004 |
| JP | 2004140678 A | 5/2004 |

(Continued)

OTHER PUBLICATIONS

"U.S. Appl. No. 11/940,635, Final Office Action mailed Mar.2, 11", 33 pgs.

(Continued)

*Primary Examiner* — Aaron Strange
(74) *Attorney, Agent, or Firm* — Shook, Hardy & Bacon L.L.P.

(57) ABSTRACT

Various embodiments herein include one or more of systems, methods, software, and data structures to create collaboration enabled client applications. In some embodiments, web services are provided on one or more servers that may be called by processes within client applications to facilitate collaboration within a workspace, such as directly within a computer application. Some such web services are application and data agnostic meaning that such web services are not aware of or do not care where application collaboration service calls come from, what their destination application is, or what data is being communicated. These web services, in some such embodiments, just must be properly called by an authorized user.

20 Claims, 5 Drawing Sheets

(56) References Cited

U.S. PATENT DOCUMENTS

| | | | |
|---|---|---|---|
| 7,099,798 | B2 | 8/2006 | Yu et al. |
| 7,107,307 | B1 | 9/2006 | Takishita |
| 7,133,831 | B2 | 11/2006 | Brown et al. |
| 7,143,136 | B1* | 11/2006 | Drenan et al. ............... 709/204 |
| 7,213,051 | B2 | 5/2007 | Zhu |
| 7,248,684 | B2 | 7/2007 | Caspi et al. |
| 7,295,752 | B1 | 11/2007 | Jain et al. |
| 7,349,944 | B2 | 3/2008 | Vernon et al. |
| 7,421,069 | B2 | 9/2008 | Vernon et al. |
| 7,437,408 | B2 | 10/2008 | Schwartz et al. |
| 7,590,941 | B2 | 9/2009 | Wee et al. |
| 7,634,533 | B2* | 12/2009 | Rudolph et al. ............. 709/203 |
| 7,945,622 | B1 | 5/2011 | Pegg |
| 7,966,397 | B2 | 6/2011 | Dong |
| 2002/0194219 | A1 | 12/2002 | Bradley et al. |
| 2003/0195791 | A1 | 10/2003 | Waller et al. |
| 2003/0208541 | A1* | 11/2003 | Musa ........................... 709/205 |
| 2004/0107256 | A1* | 6/2004 | Odenwald et al. ........... 709/205 |
| 2004/0107270 | A1 | 6/2004 | Stephens et al. |
| 2004/0111639 | A1 | 6/2004 | Schwartz et al. |
| 2004/0133647 | A1 | 7/2004 | Ozkan et al. |
| 2004/0181577 | A1* | 9/2004 | Skurikhin et al. ........... 709/204 |
| 2004/0189700 | A1 | 9/2004 | Mandavilli et al. |
| 2004/0205452 | A1 | 10/2004 | Fitzsimons et al. |
| 2004/0267871 | A1 | 12/2004 | Pratley et al. |
| 2005/0010607 | A1 | 1/2005 | Parker et al. |
| 2005/0055321 | A1 | 3/2005 | Fratkina et al. |
| 2005/0066037 | A1 | 3/2005 | Song et al. |
| 2005/0071440 | A1* | 3/2005 | Jones et al. ................. 709/218 |
| 2005/0198006 | A1 | 9/2005 | Boicey et al. |
| 2005/0210105 | A1 | 9/2005 | Hirata et al. |
| 2006/0026251 | A1 | 2/2006 | Cheng et al. |
| 2006/0026502 | A1 | 2/2006 | Dutta |
| 2006/0143043 | A1 | 6/2006 | McCallie et al. |
| 2006/0167662 | A1 | 7/2006 | Yu et al. |
| 2006/0171515 | A1 | 8/2006 | Hintermeister et al. |
| 2006/0173959 | A1* | 8/2006 | McKelvie et al. ........... 709/204 |
| 2006/0200520 | A1 | 9/2006 | Vernon et al. |
| 2006/0204213 | A1 | 9/2006 | Slone |
| 2006/0279627 | A1 | 12/2006 | Yamamoto et al. |
| 2006/0279628 | A1 | 12/2006 | Fleming |
| 2007/0050448 | A1 | 3/2007 | Gonen et al. |
| 2007/0061296 | A1 | 3/2007 | Burke et al. |
| 2007/0078821 | A1 | 4/2007 | Kubo et al. |
| 2007/0081522 | A1 | 4/2007 | Apelbaum |
| 2007/0118794 | A1* | 5/2007 | Hollander et al. ........... 715/512 |
| 2007/0143149 | A1 | 6/2007 | Buttner et al. |
| 2007/0174334 | A1 | 7/2007 | Inoue et al. |
| 2007/0186157 | A1 | 8/2007 | Walker et al. |
| 2007/0192410 | A1* | 8/2007 | Liversidge et al. .......... 709/204 |
| 2008/0005244 | A1 | 1/2008 | Vernon et al. |
| 2008/0077665 | A1 | 3/2008 | Sekaran et al. |
| 2008/0077666 | A1 | 3/2008 | Sekaran et al. |
| 2008/0130525 | A1 | 6/2008 | Jansen et al. |
| 2008/0172607 | A1 | 7/2008 | Baer |
| 2008/0189365 | A1 | 8/2008 | Narayanaswami et al. |
| 2008/0229037 | A1 | 9/2008 | Bunte et al. |
| 2008/0288580 | A1 | 11/2008 | Wang et al. |
| 2008/0320081 | A1* | 12/2008 | Shriver-Blake et al. ...... 709/205 |
| 2009/0049129 | A1* | 2/2009 | Faisal et al. .................. 709/205 |
| 2009/0099827 | A1 | 4/2009 | Georgis et al. |
| 2009/0204906 | A1 | 8/2009 | Irving |
| 2014/0029919 | A1 | 1/2014 | Codavalli et al. |
| 2014/0032655 | A1 | 1/2014 | Pegg et al. |
| 2014/0032771 | A1 | 1/2014 | Pegg et al. |
| 2014/0033073 | A1 | 1/2014 | Pegg |

FOREIGN PATENT DOCUMENTS

| | | |
|---|---|---|
| JP | 2005341015 A | 12/2005 |
| WO | WO-2009042416 A1 | 4/2009 |

OTHER PUBLICATIONS

"U.S. Appl. No. 11/940,635, Response filed Dec. 13, 2010 to Non-Final Office Action mailed Sep. 13, 2010", 14 pgs.

"U.S. Appl. No. 12/243,808, Non-Final Office Action mailed Dec. 30, 2010", 11 pgs.

"U.S. Appl. No. 12/243,819, Final Office Action mailed Oct. 27, 2010", 9 pgs.

"U.S. Appl. No. 12/243,819, Notice of Allowance mailed Mar. 8, 2011", 8 pgs.

"U.S. Appl. No. 12/243,819, Response filed Jan. 27, 2011 to Final Office Action mailed Oct. 27, 2010", 9 pgs.

"U.S. Appl. No. 12/269,736, Final Office Action mailed Jan. 28, 2011", 12 pgs.

"U.S. Appl. No. 12/269,736, Response filed Nov. 19, 2010 to Non-Final Office Action mailed Aug. 20, 2010", 13 pgs.

"U.S. Appl. No. 11/932,074, Response filed Jul. 5, 2012 to Non Final Office Action mailed Apr. 5, 2012", 12 pgs.

"U.S. Appl. No. 11/932,074, Final Office Action mailed Aug. 30, 2012", 14 pgs.

"U.S. Appl. No. 11/932,074, Non Final Office Action mailed Apr. 5, 2012", 15 pgs.

"U.S. Appl. No. 11/932,074, Pre-Appeal Brief Request for Review filed Nov. 1, 2012", 5 pgs.

"U.S. Appl. No. 11/932,074, Response filed Feb. 14, 2012 to Final Office Action mailed Nov. 14, 2011", 10 pgs.

"U.S. Appl. No. 12/269,736, Response filed Dec. 29, 2011 to Non Final Office Action mailed Sep. 29, 2011", 14 pgs.

"U.S. Appl. No. 12/269,736, Final Office Action mailed Mar. 27, 2012", 12 pgs.

"U.S. Appl. No. 11/932,074, Final Office Action mailed Nov. 14, 2011", 13 pgs.

"U.S. Appl. No. 12/243,808, Response flied Dec. 12, 2011 to Final Office Action mailed Jun. 13, 2011", 7 pgs.

"U.S. Appl. No. 11/932,074, Examiner's Answer mailed Feb. 15, 2013".

"U.S. Appl. No. 11/940,635, Non-Final Office Action mailed Nov. 23, 2012", 14 pgs.

"U.S. Appl. No. 12/269,736, Appeal Brief filed Nov. 27, 2012", 26 pgs.

"U.S. Appl. No. 11/940,635, Non Final Office Action mailed Feb. 25, 2014", 13 pgs.

"U.S. Appl. No. 11/940,635, Response filed Sep. 25, 2013 to Final Office Action mailed Jun. 28, 2013", 12 pgs.

"U.S. Appl. No. 11/940,635, Examiner Interview Summary mailed Feb. 28, 2013", 3 pgs.

"U.S. Appl. No. 11/940,635, Final Office Action mailed Jun. 28, 2013", 14 pgs.

"U.S. Appl. No. 11/940,635, Response filed Feb. 25, 2013 to Non-Final Office Action mailed Nov. 23, 2012", 12 pgs.

"U.S. Appl. No. 11/940,635, Response filed Sep. 25, 2013 to Final Office Action mailed Jun. 28, 2013", 12 pgs.

"U.S. Appl. No. 12/243,898, Examiner Interview Summary mailed Jan. 14, 2014", 3 pgs.

"U.S. Appl. No. 12/243,808, Non Final Office Action mailed Oct. 8, 2013", 10 pgs.

"U.S. Appl. No. 12/269,736, Examiner's Answer mailed Mar. 27, 2013", 13 pgs.

"U.S. Appl. No. 11/932,074, Response filed Aug. 11, 2011 to Non Final Office Action mailed May 12, 2011", 12 pgs.

"U.S. Appl. No. 11/932,074, Non Final Office Action mailed May 12, 2011", 13 pgs.

"U.S. Appl. No. 11/940,635, Response filed May 16, 2011 to Final Office Action mailed Mar. 2, 2011", 10 pgs.

"U.S. Appl. No. 12/243,808, Final Office Action mailed Jun. 13, 2011", 11 pgs.

"U.S. Appl. No. 12/243,808, Response filed Mar. 30, 2011 to Non-Final Office Action mailed Dec. 30, 2010", 7 pgs.

"U.S. Appl. No. 12/269,736, Non Final Office Action mailed Sep. 29, 2011", 12 pgs.

"U.S. Appl. No. 12/269,736, Response filed Apr. 28, 2011 to Final Office Action mailed Jan. 28, 2011", 14 pgs.

"ESPRE Live Features: Many-to-many video conferencing", [Online]. Retrieved from the Internet: <URL:http://www.espresolutions.com/pdf/ESPRE.pdf>, 4 pgs, Date Unknown.

"Video Conferencing: P2P Solution From VSee Launches New Free Full Collaboration Version", [Online]. Retrieved from the Internet:

(56) References Cited

OTHER PUBLICATIONS

<URL:http://www.masternewmedia.org/news/2007/03/05/video_conferencing_p2p_solution_from.htm>, (May 5, 2007), 18 pgs.

"U.S. Appl. No. 11/940,635, Non-Final Office Action mailed Sep. 13, 2010", 33 pgs.

"U.S. Appl. No. 12/243,819, Non-Final Office Action mailed May 17, 2010", 9 pgs.

"U.S. Appl. No. 12/243,819, Response filed Aug. 17, 2010 to Non Final Office Action mailed May 17, 2010", 10 pgs.

"U.S. Appl. No. 12/269,736, Non-Final Office Action mailed Aug. 20, 2010", 13 pgs.

"International Application No. PCT/US2008/076034, International Search Report and Written Opinion mailed Mar. 6, 2009", 12 pgs.

Chabert, A., et al., "Java Object-Sharing in Habanero", Communications of the Association for Computing Machinery vol. 41 (6), (Jun. 1, 1998), 69-76.

Handley, et al., "Session Initiation Protocol", RFC 2543: IETF, (Mar. 1999), 1-153.

Lukasz, B., et al., "TANGO—a Collaborative Environment for the World-Wide Web", Northeast Parallel Architectures Center, Syracuse University, URL:http://citeseerx.ist.psu.edu/viewdoc/summary?doi=10.1.1.52.768, Date Unknown.

Morrison, D., et al., "Lotus Sametime Application Development Guide", Internet Citation, URL:http://wwvv.redbooks.ibm.com/redbooks/pdfs/sg245651.pdf, (May 2000).

* cited by examiner

APPLICATION AND DATA AGNOSTIC COLLABORATION SERVICES

BACKGROUND INFORMATION

Use of network hosted conferencing, such as over the Internet, has grown considerably in recent years. There are many products on the market that allow a presenter to share views and audio over a central server with many conference participants. Some of these products may also be used in a collaborative environment, such as between members of a development team. In such instances, control of a computer or computer application on one computer may be shared over a network with other users. Such products offer such functionally in a very similar manner through a server that requires a standalone client software application on each computer of each participant. Such client software is tightly coupled to a server that receives data from one client and distributes the data other participating clients. The client software is typically created and distributed by the same developer of the server software to prevent compatibility and security issues between the client and server software.

DETAILED DESCRIPTION

Although current network hosted conferencing and collaboration tools provide many options, the utility of a conference is limited by such tools. These tools generally fail to allow embedding of collaboration abilities within applications and web pages/sites. For example, if a first user wishes to share a view of an application with a second remote user, both first and second users must launch a conferencing or collaboration specific application or website and the first user must designate which application to share. The communication of data between users must be made in a format that may be understood by processes of a central server. Further, communication between the first user and the second remote user is typically limited to image-based screen shares.

Some of the various embodiments as described herein provide systems, methods, software, and data structures that enable application and data agnostic collaboration services. Some such application and data agnostic collaboration services allow embedding of collaboration services within applications to remove the need for use of separate conferencing or collaboration applications. These embodiments, and others, may provide such services by decoupling client-server communication from client-specific applications and allowing such communications to be made through web service calls to services offered by a server. In some embodiments, data may be communicated between client applications in a format that is not understood by the server, but rather is specific to the applications connected to a collaboration session. Some embodiments may also include collaboration tools embedded within applications from a set of developer tools operative with a collaboration server. These and other embodiments are described in detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this disclosure to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
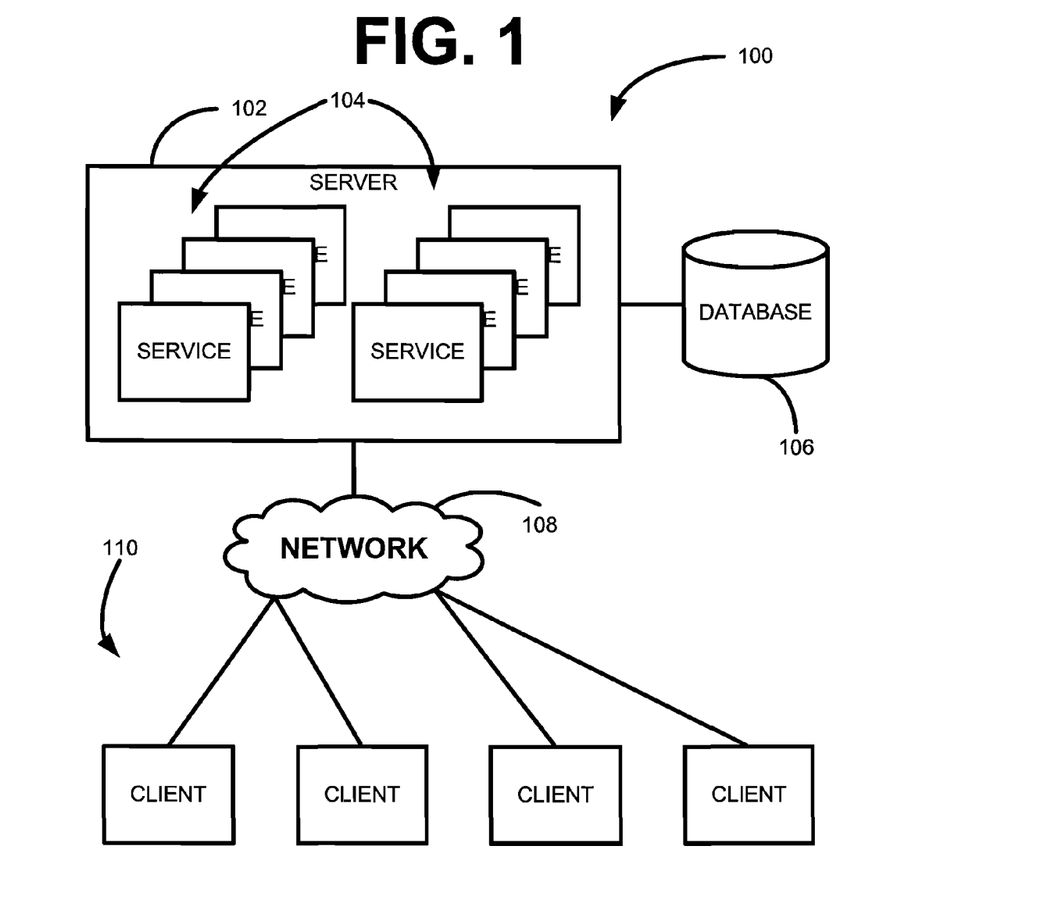
FIG. 1 is a block diagram of a system according to an example embodiment.

FIG. 1 is a block diagram of a system 100 according to an example embodiment. The system 100 typically includes a server 102 that may communicate with clients 110 over a network 108. The server 102 may offer one or more collaboration services 104 to the clients 110 through web service calls that may be sent to and received from the collaboration services over the network 108.

In some embodiments, the collaboration services 104, when called or otherwise utilized, may consume, manipulate, create, or store data. This data may stored on the server 102, on another server, in a database 106, or in another data storage location. In some embodiments, this data may include data identifying authorized users, user or organizational collaboration service subscription and usage information, configuration settings, and other data that may be consumed, manipulated, created, or stored during operation of one or more of the collaboration services 104.

The collaboration services 104 divide functionality of collaboration applications to allow other applications to leverage collaboration functionality. This provides the potential to develop any number of different kinds of client 110 applications that all rely on the same collaboration services 104. Accordingly, a developer may conveniently add new features to a client 110, leveraging a provided set of collaboration services 104. For example, one embodiment may expose streaming audio/video, data messaging, and presence, user identity, roles, and the like as services that may be leveraged by client applications.

In addition, as mentioned above, previous collaboration applications required that everything performed by a server be tightly bound to one specific client. To the contrary, some embodiments may include a cloud of servers, dedicated to provisioning of collaboration services, which may host collaboration rooms or sessions of virtually any client. Further, any number of variations and types of clients may be specifically built and embedded within other applications, such as a graphics editing application, a page description language view application, a word processing application, and other typical stand alone application types. Some embodiments may also include provisioning of collaboration services 104 within websites allowing collaboration between team members, communication between a customer and merchant, buyer and seller, teacher and student, friends and family, and others. Thus, although termed collaboration services 104, the use of such services is not so limited. The collaboration services 104 are communication tools that may be embedded within applications, websites, and other codes having a capability to call and utilize web services or other objects providing the collaboration services 104.

Some embodiments may be realized with respect to two parts. Firstly, one or more servers 102 may be dedicated, in whole or in part, may be refactored from working with a specific application to working with any kind of real-time client 110 collaboration application. Secondly, client 110 applications may be "componentized." For example, clients 110 may be broken down so that any developer who wants to build a real-time collaboration application can reutilize the specific client 110 components and include these components into client 110 applications or merge them into unique client 110 applications. By mixing and matching client 110 components, which know how to speak directly to a set of services 104, a developer may build multiple variations of client applications 110 that enable real-time collaboration or other communication. Client-side components, such as webcam, rosters, shared whiteboards, text-based chat, and the like, are provided to developers. Each of such components rely on their specific and dedicated web service for the respective component type.

Some such embodiments provide a developer kit of controls or tools that may be embedded within client 110 applications and configured to communicate with the services 104 on one or more servers 102. Some embodiments, such as web-based embodiments and some stand-alone application embodiments, may include code that invokes a client plug-in, such as the Adobe® Flash® player available from Adobe Systems Incorporated of San Jose, Calif., or other runtime client.

Figure 2:
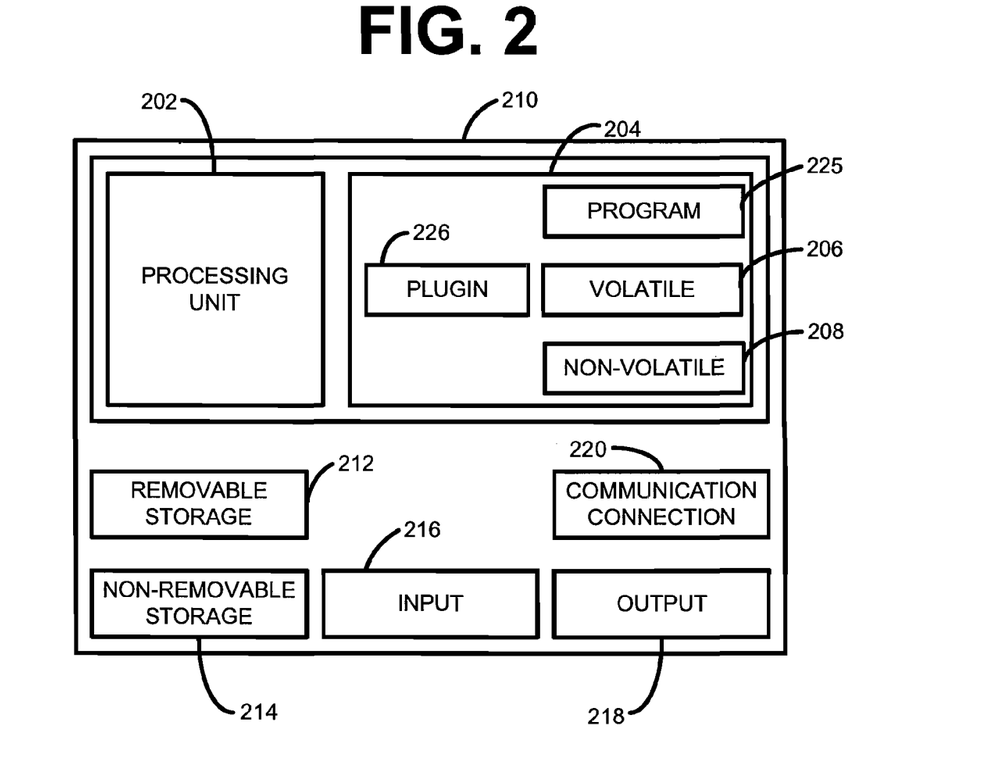
FIG. 2 is a block diagram of a client system according to an example embodiment.

FIG. 2 is a block diagram of a client system 210 according to an example embodiment. In one embodiment, multiple such client systems 210 are utilized in a distributed network in a collaborative application environment. A service-oriented architecture may be used to implement such services and communicate between the multiple client systems 210 and collaboration services on a server. One example client system 210 in the form of a computer may include a processing unit 202, memory 204, removable storage 212, and non-removable storage 214. Memory 204 may include volatile memory 206 and non-volatile memory 208. Client system 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Client system 210 may include or have access to a computing environment that includes input 216, output 218, and a communication connection 220. The input 216 may include one or more of a pointing device such as a mouse, a keyboard, electronic pen type input, an audio input device such as a microphone coupled to an audio card or other dedicated audio circuit, a web cam, a screen capture program or device, or other input device. The output 218 may include a video monitor, speakers coupled to the audio card or other dedicated audio circuit, a printing device, or other output device.

The client system 210 typically operates in a networked environment using the communication connection 220 to connect to one or more remote computers, such as one or more servers offering collaborative services that enable collaboration between client system 210 and other remote computers. The remote computers may include one or more of a personal computer ("PC"), server, router, network PC, a peer device, or other common network node, and the like. The communication connection 220 may include a Local Area Network ("LAN"), a Wide Area Network ("WAN"), the Internet, a Virtual Private Network ("VPN"), a peer-to-peer network, or other networks.

Computer-readable instructions stored on a computer-readable medium are executable by the processing unit 202 of the client system 210. A hard drive, CD-ROM, and RAM are some examples of articles including a computer-readable medium. For example, a computer program 225 implementing collaboration services of a collaboration server by capturing one or more of data, gestures, video, audio, and the like within the computer application 225 or on the client system and transmitting the captured data to a collaboration server utilizing web service calls. The collaboration server may then replicate the data and send the data to one or more remote computers. The computer program 225 may also receive such data from the collaboration server, the data originating on one or more remote computers. Upon receipt of data from the collaboration server, the data is parsed to identify a portion of the application to which the data pertains and then the data is evaluated to determine what to do. This may include replicating a computer program action represented in the data, replicating data, opening an audio or video stream, playing audio or video data, replicating a gesture action with a gesture tool such as a mouse, or other action or data modification, deletion, creation, or insertion. In some embodiments, the computer application 225 leverages functionality of a plug-in 226 to perform one or more functions such as capturing, outputting, encoding, and/or decoding collaboration data. As mentioned above, the plug-in may be the Adobe® Flash® player. However, in other embodiments, the plug-in 226 may be a custom developed piece of software developed to implement one or more services offered by a collaboration server.

Figure 3:
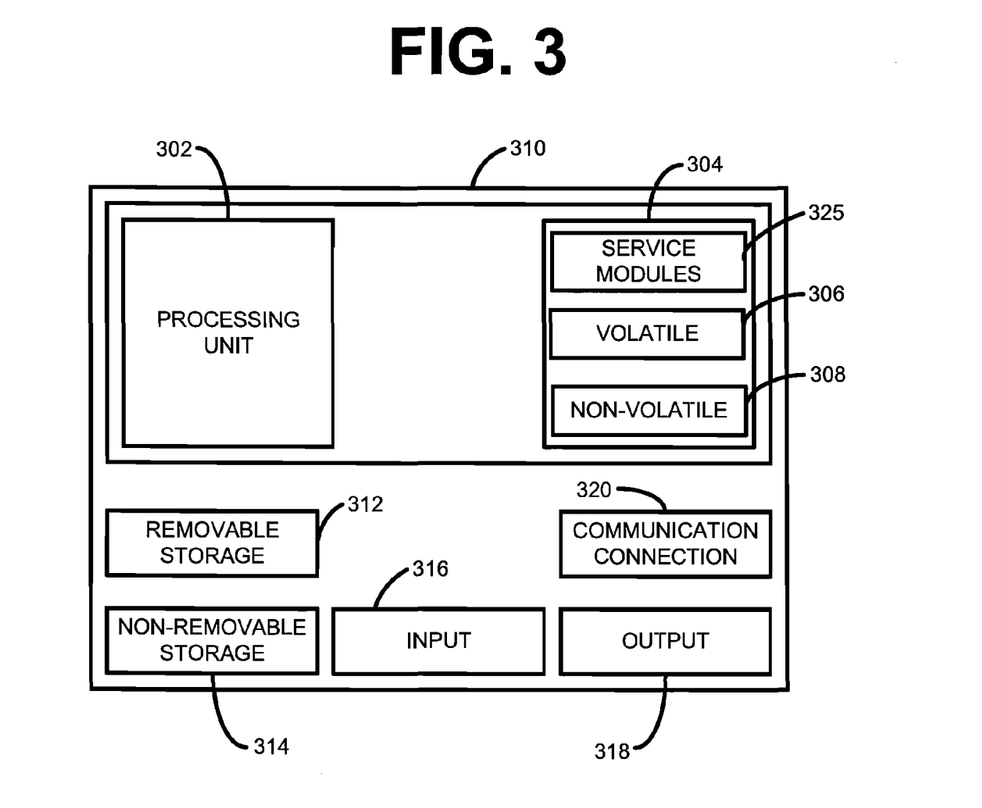
FIG. 3 is a block diagram of a server system according to an example embodiment.

FIG. 3 is a block diagram of a server system 310 according to an example embodiment. In one embodiment, multiple such server systems may utilized in a distributed network to implement multiple services in a collaborative application environment. A service-oriented architecture may be used to implement such services and communicate between the multiple client systems implementing collaboration services offered by the server system 310 and potential other server systems 310, depending on the embodiment. One example server system 310 is in the form of a computer, which may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Server system 310 may include or have access to a computing environment that includes input 316, output 318, and a communication connection 320. The computer may operate in a networked environment using the communication connection 320 to connect to one or more remote computers, such as one or more client systems 210 illustrated in and described with regard to FIG. 2. The communication connection 320 may include a Local Area Network ("LAN"), a Wide Area Network ("WAN"), the Internet, a Virtual Private Network ("VPN"), a peer-to-peer network, or other networks.

Figure 4:
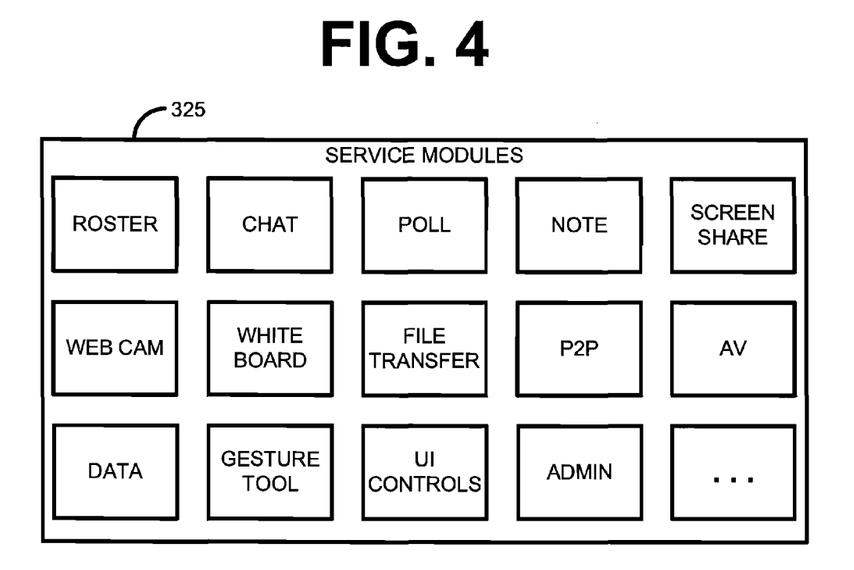
FIG. 4 is a block diagram of service modules included within a server system according to an example embodiment.

Computer-readable instructions stored on a computer-readable medium are executable by the processing unit 302 of the server system 310. A hard drive, CD-ROM, and RAM are some examples of articles including a computer-readable medium. The computer-readable medium, in an example embodiment, may include one or more service modules 325 that are operable to provide collaboration services, such as web services, to client collaboration applications. In typical embodiments, the collaboration service modules 325 are application and data agnostic, meaning that the collaboration service modules allow any application to call the collaboration services and the collaboration services may be a conduit for transmission of any data so long as an appropriate collaboration service is utilized. For example, a client application may be developed to utilize a general collaboration service. The general collaboration service may only require that data received from a first client collaboration application to be broadcast to one or more other client collaboration applications include a minimal amount of specific data when the service is called, and all other data included in the service call is just broadcast to the other client collaboration applications. Further, the collaboration services may only require that they be called in a particular manner, such as a proper formatting of the service calls, and do not require that they be called by a particular client program. As a result, any client application may utilize the services of the service modules 325 to collaborate with virtually any type of data the client applications may utilize. FIG. 4, and its description below, provides detail as to the services modules 325 that may be available in some embodiments.

FIG. 4 is a block diagram of service modules 325 included within a server system 310, as illustrated in FIG. 3, according to an example embodiment. The service modules 325, as described above, provide services, such as web services, that may be utilized by client collaboration applications. The service modules typically receive data from a first client collaboration application through a web service call and broadcast the received data to other client collaboration applications participating in a collaboration session, such as by joining a collaboration "room."

A collaboration server, such as server system 310 of FIG. 3, typically provides several collaboration services. These collaboration services may implemented through service modules 325, which may be objects, programs, application programming interfaces, or other units of software. In some embodiments, each service is embodied in a single module. In other embodiments, multiple services are embodied in a single module. Combinations of services within modules may be made based on a class of functionality, such as by the type of data communicated through the module, the type of communication, such as inbound or outbound, or in virtually any other manner. However, in other embodiments, a single service module may include a single service that is entirely data and application agnostic. Thus, although the service modules 325 are described below as providing certain services, these services may be provided in a single module, a few modules, or many modules. The name given to the particular 325 module in the following description is given merely to describe the type of functionality the particular service module is provided for and is not intended to limit modules within which services may be included.

The service modules 325 may include modules to implement functionality, such as: roster, chat, polling, notes, screen sharing, web cam or other streaming video, shared white board, file transfer, transfer of data to enable peer-to-peer ("P2P") communication between two or more client applications, audio and visual, general data transfer, gesture tool (such as a pointing device or cursor), user interface controls, administration, and others depending on the embodiment. In some embodiments, the service modules 325 may be downloaded by a client to implement the functionality of the service module on the client. In such embodiments, the service modules 325 include client side logic to handle data that may be communicated via the collaboration server system 310.

A roster service module, in some embodiments, offers services to identify collaboration session participants and present participant information in a roster type control on one or more client collaboration applications connected to a collaboration session. The roster module may also provide services to identify and implement roles of one or more collaboration session participants, such as organizer, presenter, administer, participant, and the like. Such roles may be declared using administrative services of the administration module.

The administration module may also be used to create or schedule a collaboration session, authorize participants of a collaboration session, modify or create participant roles and permissions, declare a collaboration session as closed to a finite number of participants, certain participants, or publicly available.

The chat service module typically provides services that enable text-based chat between collaboration session participants. In some embodiments, the chat services may allow a participant to send a chat message to less than all of the other participants if desired. In some embodiments, based on a permissions of a certain role as declared in the administration service module, messages of a particular participant may be blocked from transmission to other participants, such as in the event the block participant is abusing the chat functionality. Chat messages may also be sent to an administrator for approval prior to communication to other collaboration session participants.

The polling service module typically allows one participant to set up a poll for other participants to answer. The polling service module may then collect the results of the poll and present them to the creator. The polling results may also be shared with one or more other participants.

The note service module typically provides services that allow transmission of a note to one or more other participants. This may include a text block placed as a control on a certain portion of a shared screen view. The Screen share service module provides services to share a screen view of one client application with other participants. The screen share services may also allow sharing control of the screen, such as allowing one or more other participants to provide input via a keyboard and pointing device.

The web cam service module typically provides services to share streaming video between collaboration session participants. In some embodiments, use of the web cam service module services may be configured through services of one or more of the administration and web cam service modules to limit the number of shared video streams or allow only a presenter's video stream to be displayed. A shared video stream may also include audio.

The white board service module provides services to receive and share whiteboard type input. Whiteboard input typically includes drawings made within a virtual whiteboard. As with the streaming video services described above, use of the whiteboard services may be limited to only a presenter and/or other roles.

The file transfer service module typically includes services that allow one collaboration session participant to upload a file and transfer the file to all, or a select number of, other participants. For example, a file may be uploaded and designated for transmission to one or more specific participants based on identity data from the roster service module, participants having a particular role or permission level, participants in a certain department or geographic location based on data which may be stored in a location accessible to a client collaboration application or accessible by a service module service, or based on other criteria.

The P2P service module includes services to facilitate exchange of network connectivity data between two or more users to establish a peer-to-peer communication connection between the users over a network. In some such embodiments, once the network connectivity data has been exchanged utilizing a service of the P2P service module, two or more client collaboration applications may exchange collaboration data directly with one another. In some such embodiments, a collaboration session may then be conducted, in whole or in part, in a P2P fashion.

The audio/visual service module includes services to exchange audio, video, and combined audio and video, such as in streams, between collaboration session participants. In some embodiments, the audio and video services may be unidirectional, meaning that audio and video of only one participant is shared at a time as set utilizing one or more services of the audio/visual or administration service modules. The audio services, in some embodiments, may include Voice over Internet Protocol ("VoIP") services. Audio and visual data may also be administered to be shared only by or with certain individual participants or participants having a particular role.

The gesture tool service module may include services to share gestures made by participants with a pointing device, such as a mouse, a cursor within an application, a highlighting tool, or other gesturing device. The user interface controls service module may include services that are specific to certain user interface controls. In some embodiments, user interface control services identify a particular control within client collaboration applications and an action with regard to that control, such as "has focus," "clicked," typed text, submit, or other action.

The data service module includes services to allow exchange of free-form data between collaboration applications. Such services are data and application agnostic, meaning that the data service module does not process the service calls to verify the data came from a specific type of application or that the data is of a particular type or in a particular format. These services merely require that the service be called or invoked in a proper manner. Such services allow application developers to create customized application elements and share data in a collaborative fashion between the elements. Such application elements may include elements that capture data within applications that is to be shared with collaboration session participants. Such data may include text from documents, numeric data from spreadsheets, data indicative of actions performed within an application, or other data within virtually any other application. In some embodiments, the data services may be embedded within an application in a manner that is not visible, or otherwise apparent to a user. This data, once captured, may be transmitted using the services of the data service module and communicated to other participants. The other participants receive this data and the application will handle the data as specified by a developer of the application. Thus, using the services of the data service module, custom applications may be developed with customized collaboration features to capture data and actions and receive and process or display those actions within application instances of collaboration session participants.

Note that, in some embodiments, the applications of collaboration session participants are not required to be identical applications. What is required is that the respective applications of the participants be enabled to communicate utilizing the services of the service modules 325 of the server system 310 illustrated and described with regard to FIG. 3 and FIG. 4.

Figure 5:
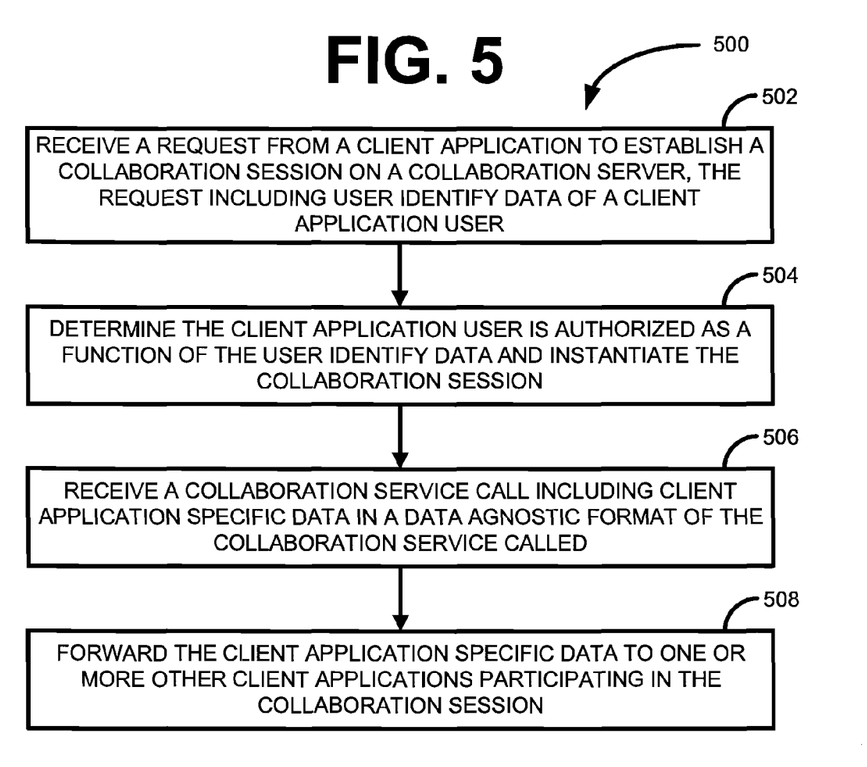
FIG. 5 is a block flow diagram of a method according to an example embodiment.

FIG. 5 is a block flow diagram of a method 500 according to an example embodiment. The method 500 is an example of a method that may be implemented on a server providing one or more collaboration services to client applications. In some embodiments, the method 500 may include receiving a request from a client application to establish a collaboration session on a collaboration server, the request including user identity data of a client application user 502. The method 500 may further include determining whether the client application user is authorized as a function of the user identity data and instantiating the collaboration session 504. After instantiating the collaboration session, which may also be considered a virtual meeting room, the method 500 includes receiving a collaboration service call including client application specific data in a data agnostic format of the collaboration service called 506 and forwarding the client application specific data to one or more other client applications participating in the collaboration session 508. The collaboration server in typical embodiments need not be aware of the type of client application requesting the collaboration session; rather, the collaboration server just ensures the collaboration services are called invoked in a proper manner.

In some embodiments of the method 500, receiving the request from the client application to establish the collaboration session 502 includes receiving a first web service call from the client application to establish the collaboration session and receiving a second web service call to authorize one or more other users to participate in the collaboration session. Such embodiments may further include receiving one or more third web service calls to designate permissions of the one or more other users authorized to participate in the collaboration session.

In some embodiments of the method 500, the collaboration session facilitates collaboration between client applications through a set of web services including functionality and data specific web services and one or more data agnostic web services. The one or more data agnostic web services, when called, may receive data from a client application participating in the collaboration session. A called web service may then forward the data to one or more other client applications participating in the respective collaboration session.

Some further embodiments may include a system having a server. The server may include a set of collaboration service modules operable to provide services of the collaboration service modules over a network interface, such as a network interface card. The collaboration service modules are typically operable to provide one or more of user identity, role and permission, and presence services and one or more services to share client application data between applications of two or more clients authorized to utilize the services. At least one collaboration service may be operable to receive data from a first user and serve the data to at least a second user over the network interface without regard to the type of data or an application of the first user from which the data is received. Additional collaboration service modules may be operable to provide one or more of audio and video sharing services, text-based messaging services between two or more users, shared whiteboard services, collaboration session, or room, management services operable to allow a meeting organizer to create and administer settings of a networked based conference. Some of these embodiments, and others, may also include roster services that provide a listing to one or more users of all users connected to the server or to a particular collaboration session. Some embodiments of the server may also provide file transfer services to facilitate transfer of an electronic data file from one user to one or more other users connected to the server, such as one or more users participating in a particular collaboration session.

In some embodiments, the room management services allow a meeting organizer to define policies such as policies that may authorize users to connect to a network-based conference and designate permissions of the authorized users. Permissions of authorized users in some such embodiments may be set on a service-based level to allow or prevent utilization of services of the collaboration service modules individually or as a whole. In some embodiments, a user is a human user of a collaboration service enabled client application. However, a user need not be a human user. The collaboration services offered by a server may be leveraged by processes within an interactive server, such as a web server or other interactive computing process. In such embodiments, the collaboration services may be utilized as middleware messaging services. In some embodiments, the policies a meeting organizer, or other designated administrator, may define or modify policies regarding how data of a networked-based conference is stored. Such policies may cause a networked-based conference data to be made available across multiple session, be merely transient and not logged or stored, persisted during a conference or for a period and then deleted, recorded and stored indefinitely, or other duration which may be desired and specified in a policy.

Some embodiments include a system having a local application including instructions to establish and maintain a network connection with one or more remote applications for exchanging data. Such embodiments typically include establishing and maintain the network communication connections via calls of one or more services offered by one or more collaboration servers without regard to the type of exchanged data or local or remote applications. The local application and the one or more remote applications may be separate instances of the same application. The local application and the one or more remote applications may each include one or more collaboration tools embedded therein, such as a shared whiteboard module, chat module, or module that may be needed to communicate with one or more of the services. In some embodiments, one or more elements collaboration tools, such as a shared whiteboard, chat window, roster, and the like may be included within a plug-in that may be called by a collaboration enabled application.

In some embodiments, data exchanged between a collaboration-enabled client application and a collaboration server may be communicated in a data structure. The data structure, in one embodiment, may include a wrapper portion identifying a web service being called, or otherwise being utilized, such as a data agnostic web service. The data structure may further include a data portion. The data portion may include data identifying a collaboration session for which the data structure pertains and a web service data portion holding data that to be distributed by the called collaboration web server to other participants of the collaboration session or to be displayed or otherwise processed by the collaboration-enabled applications of the other participants. In some embodiments, the web service data portion holds free-form data including data from an originating client application to be communicated to other participant client applications of the collaboration session. The free-form data may be data of a custom developed collaboration tool included within collaboration enabled client applications. The data portion may further include data identifying a user of the originating client application.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   at least one processor;
   at least one memory device;
   a server process stored in the at least one memory device including a set of collaboration service modules executable by the at least one processor to provide services of the collaboration service modules over a network interface that receives and transmits collaboration data in a format that is not understood by the server process, the set of collaboration service modules operable to provide:
- one or more of user identity, role and permission, and presence services;
- one or more services to share client application data between applications of two or more clients authorized to utilize the user identity, role and permission, and presence services; and
- at least one collaboration service module in the set of collaboration service modules operable to receive free-form collaboration data from a first user and serve the free-form collaboration data to at least a second user over the network interface without regard to the type of free-form collaboration data, an application of the first user from which the free-form collaboration data is received, or an application of the at least second user to which the free-form collaboration data is served.

2. The system of claim 1, the collaboration service modules are further operable to provide one or more of:
- audio and video sharing services;
- text-based messaging services between two or more users;
- shared whiteboard services;
- room management services operable to allow a meeting organizer to create and administer settings of a network-based conference;
- roster services that provide a listing to one or more users of users connected to the server; and
- file transfer services to facilitate transfer of an electronic data file from one user to one or more other users connected to the server.

3. The system of claim 2, wherein the room management services allow a meeting organizer to authorize users to connect to the network-based conference and designate permissions of the authorized users.

4. The system of claim 3, wherein permissions of authorized users are set on a service-based level to allow or prevent utilization of services of the collaboration service modules.

5. The system of claim 2, wherein the audio and video sharing services include a Voice Over Internet Protocol ("VoIP") service.

6. The system of claim 1, wherein a user is a human user of a client application.

7. The system of claim 1, wherein the collaboration service modules are further operable to provide a peer-to-peer facilitation service to exchange network connectivity data between two users to establish a peer-to-peer communication connection between the two users over a network.

8. A system comprising at least one processor, at least one memory device, and a local application including instructions stored in the at least one memory device and executable by the at least one processor to establish and maintain a network connection with one or more remote applications for exchanging free-form collaboration data in a format that is not understood by one or move collaboration servers, via calls of one or more services offered by the one or more collaboration servers without regard to the type or content of exchanged free-form collaboration data and local applications or remote applications that communicate with the one or more collaboration servers and exchange the free-form collaboration data when the calls are properly invoked by the local applications or the remote applications while ignoring the identity of the local application or the remote applications.

9. The system of claim 8, wherein the local application and the one or more remote applications are separate instances of the same application.

10. The system of claim 8, wherein the local application and the one or more remote applications each include one or more collaboration tools.

11. The system of claim 10, wherein the one or more collaboration tools include a collaborative whiteboard module.

12. The system of claim 10, wherein the one or more collaboration tools include a roster module operable to display user presence data of the local and one or more remote applications.

13. The system of claim 8, wherein the calls of the one or more services offered by the one or more collaboration servers includes calls to one or more of:
- an audio and video sharing service;
- a text-based messaging service; and
- a room management service operable to allow a meeting organizer to create and administer settings of a network-based conference.

14. The system of claim 8, wherein the calls of the one or more services offered by the one or more collaboration servers includes a call to exchange connectivity data between two users to establish a peer-to-peer communication connection between the two users over a network.

15. A method comprising:
- establishing a network connection;
- maintaining the network connection with one or more remote applications for exchanging free-form collaboration data in a format that is not understood by one or more collaboration servers, via calls of one or more services offered by the one or more collaboration servers without regard to the type or content of exchanged free-form collaboration data, and the local application or the one or more remote applications;
- communicating with the one or more collaboration servers over the network connection; and
- exchanging the free-form collaboration data when the calls are properly invoked by the local application or the one or more remote applications while ignoring the identity of the local application or the one or more remote applications.

16. The method of claim 15, further comprising:
- receiving a call from the local application or the one or more remote applications that includes user identity data; and
- determining whether the user of the local application or the one or more remote applications is authorized to access the one or more collaboration servers.

17. The method of claim 15, further comprising:
- exchanging free-form collaboration data such that the one or more collaboration servers are unable to understand the free-form collaboration but the local application or remote applications are able to understand the free-form collaboration data.

18. The method of claim 15, further comprising:
- establishing whether the free-form collaboration data is retained, logged, or discarded based on a policies set of the one or more collaborations servers.

19. The method of claim 15, further comprising:
- receiving a call from the local application or the one or more remote applications that includes user identity data;
  - determining whether the user of the local application or the one or more remote applications is authorized to access the one or more collaboration servers;
  - if the user is authorized, exchanging the free-form collaboration data; and if the user is unauthorized, preventing the exchange of the free-form collaboration data.

20. The method of claim 15, further comprising:
receiving a call from the local application or the one or more remote applications that designates permissions based on the user identity data.

\* \* \* \* \*